US010738668B2

(12) United States Patent
Walker et al.

(10) Patent No.: US 10,738,668 B2
(45) Date of Patent: Aug. 11, 2020

(54) AUTOMOTIVE DRIVELINE UNIT HOUSING WITH LUBRICANT FEED PASSAGE AND FLOW RESTRICTOR

(71) Applicant: GKN Driveline North America, Inc., Auburn Hills, MI (US)

(72) Inventors: Kevin M. Walker, Rochester Hills, MI (US); Eric J. LaMothe, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 288 days.

(21) Appl. No.: 15/742,643

(22) PCT Filed: Jul. 10, 2015

(86) PCT No.: PCT/US2015/039894
§ 371 (c)(1),
(2) Date: Jan. 8, 2018

(87) PCT Pub. No.: WO2017/010968
PCT Pub. Date: Jan. 19, 2017

(65) Prior Publication Data
US 2018/0202331 A1 Jul. 19, 2018

(51) Int. Cl.
*F16H 57/04* (2010.01)
*F01M 9/08* (2006.01)
(Continued)

(52) U.S. Cl.
CPC .............. *F01M 9/08* (2013.01); *F16H 57/04* (2013.01); *F16H 57/042* (2013.01);
(Continued)

(58) Field of Classification Search
CPC ......... F01M 9/08; F16H 57/04; F16H 57/042; F16H 57/0421; F16H 57/0423;
(Continued)

(56) References Cited

U.S. PATENT DOCUMENTS

| 2,240,118 A | 4/1941 | Matthews |
| 2,368,963 A | 2/1945 | Boden |

(Continued)

FOREIGN PATENT DOCUMENTS

| CN | 101038028 A | 9/2007 |
| CN | 101160481 A | 4/2008 |

(Continued)

OTHER PUBLICATIONS

Written Opinion & International Search Report for PCT/US2015/039894 dated Oct. 8, 2015, 12 pages.
(Continued)

*Primary Examiner* — Edwin A Young
(74) *Attorney, Agent, or Firm* — Jennifer M. Brumbaugh; Reising Ethington P.C.

(57) ABSTRACT

An automotive driveline unit housing can be that of a power transfer unit (PTU), a final drive unit (FDU), or a rear drive unit (RDU). The automotive driveline unit housing has a lubricant feed passage spanning from an inlet to an outlet. The outlet can be situated near a seal of the automotive driveline unit, near a bearing of the unit, near both the seal and bearing, or near another component. The lubricant feed passage can have a flow restrictor located near its outlet. When the unit is in a connected state, lubricant is received in the lubricant feed passage via a spinning gear of the unit. The received lubricant trickles through the flow restrictor. And when the unit is in a disconnected state, lubricant continues to trickle through the flow restrictor, even though lubricant may no longer be received in the lubricant feed passage via the gear.

20 Claims, 3 Drawing Sheets

(51) Int. Cl.
*F16N 7/02* (2006.01)
*F16N 27/00* (2006.01)
*F16H 57/12* (2006.01)
*F16N 7/26* (2006.01)

(52) U.S. Cl.
CPC ..... *F16H 57/0424* (2013.01); *F16H 57/0447* (2013.01); *F16H 57/0457* (2013.01); *F16H 57/0465* (2013.01); *F16H 57/0471* (2013.01); *F16H 57/0483* (2013.01); *F16H 57/12* (2013.01); *F16N 7/02* (2013.01); *F16N 27/005* (2013.01); *F16H 57/0409* (2013.01); *F16H 57/0469* (2013.01); *F16N 7/26* (2013.01)

(58) Field of Classification Search
CPC ............. F16H 57/0424; F16H 57/0426; F16H 57/0447; F16H 57/0457; F16H 57/0465; F16H 57/0483
See application file for complete search history.

(56) References Cited

U.S. PATENT DOCUMENTS

| | | |
|---|---|---|
| 3,366,210 A | 1/1968 | Webster |
| 3,768,613 A | 10/1973 | Brunner |
| 3,838,751 A | 10/1974 | Brown |
| 3,887,037 A | 6/1975 | Haluda et al. |
| 4,429,587 A | 2/1984 | Finn, III et al. |
| 4,693,350 A | 9/1987 | Sommer |
| 5,662,188 A | 9/1997 | Ito et al. |
| 7,422,536 B2 | 9/2008 | Grochowski et al. |
| 7,448,977 B2 | 11/2008 | Janson et al. |
| 8,215,440 B2 | 7/2012 | Hoffmann et al. |
| 8,267,826 B2 | 9/2012 | Duong et al. |
| 8,512,193 B1 | 8/2013 | Hilker et al. |
| 8,840,509 B2 | 9/2014 | Pignard |
| 8,845,473 B2 | 9/2014 | Nett et al. |
| 2005/0064979 A1* | 3/2005 | Suganuma ............ F16C 19/182 475/246 |
| 2006/0211530 A1* | 9/2006 | Weith .................. F16H 57/0483 475/160 |
| 2010/0038174 A1* | 2/2010 | Mordukhovich ... F16H 57/0413 184/6.12 |
| 2010/0144480 A1 | 6/2010 | Downs et al. |
| 2010/0180721 A1* | 7/2010 | Quehenberger .... F16H 57/0419 74/606 R |
| 2012/0073403 A1 | 3/2012 | Perakes et al. |
| 2014/0231209 A1 | 8/2014 | Nett et al. |
| 2014/0231211 A1 | 8/2014 | Nett et al. |

FOREIGN PATENT DOCUMENTS

| | | |
|---|---|---|
| CN | 102422057 A | 4/2012 |
| EP | 2574826 A1 | 4/2013 |
| JP | 2007315456 A | 12/2007 |
| WO | WO2006114970 A1 | 11/2006 |

OTHER PUBLICATIONS

EP Extended Search Report for EP Application No. 15898421.1 dated Nov. 14, 2018, (9 pages).
Chinese Office Action for Chinese Application No. 201580081607.X dated Nov. 14, 2019 (25 pages).

* cited by examiner

AUTOMOTIVE DRIVELINE UNIT HOUSING WITH LUBRICANT FEED PASSAGE AND FLOW RESTRICTOR

TECHNICAL FIELD

The present disclosure relates generally to automotive driveline units such as power transfer units (PTUs), final drive units (FDUs), and rear drive units (RDUs), and relates more particularly to lubricating components of automotive driveline units that are equipped with disconnect and re-connect capabilities.

BACKGROUND

In general, automotive drivelines transmit torque from an engine and eventually to a set of wheels. Automotive drivelines, such as all-wheel drive (AWD) drivelines, sometimes include power transfer units (PTUs), final drive units (FDUs), rear drive units (RDUs), or a combination of these units to transmit the torque. The exact units in a particular automotive driveline often depends on the location of the engine and on the location of the accompanying transmission. The PTUs, FDUs, and RDUs typically include gears, shafts, bearings, seals, and other components. Lubricant held in a unit ordinarily makes its way to some of its components when the lubricant is sloshed and splashed about amid use of the unit. The lubricant is used to both lubricate and cool components.

Further, the PTUs, FDUs, and RDUs can be equipped with disconnect and re-connect capabilities in which disconnected components are no longer driven to transmit torque between them. The capabilities preclude driven torque in regions of the automotive drivelines not needing torque at a particular time. For instance, on-demand AWD drivelines do not always transmit torque among all of its shafts at all times. Disconnect and re-connect capabilities have been shown to enhance fuel efficiency, reduce emissions, and provide yet additional performance improvements.

Providing proper lubrication to unit components with disconnect and re-connect capabilities has presented challenges. It has been found, for instance, that the disconnected components no longer slosh and splash the lubricant about since the components are no longer spinning in this state, or at least are not spinning as they did in the connected state. As a consequence, when disconnected, lubricant might not always make its way to some of the unit's components.

SUMMARY

In one implementation, an automotive driveline unit housing may include a wall. The wall may partly or more define an interior of the automotive driveline unit housing. A lubricant bath may be held in the interior. The wall may have a lubricant feed passage spanning from an inlet to an outlet. The inlet may be open to the interior in order to receive lubricant from the lubricant bath. The lubricant feed passage may have a flow restrictor located in it near the outlet. The flow restrictor may inhibit the flow of lubricant that exits the outlet. During use, when the automotive driveline unit is in a connected state, lubricant from the lubricant bath may be received through the inlet and into the lubricant feed passage. The lubricant may be sloshed and splashed about by way of a spinning component of the automotive driveline unit in the connected state. The lubricant received in the lubricant feed passage may trickle through the flow restrictor and exit the outlet. The lubricant received in the lubricant feed passage may pool upstream of the flow restrictor in the lubricant feed passage. During use, when the automotive driveline unit is in a disconnected state, the component of the automotive driveline unit may cease spinning and may no longer slosh and splash lubricant about as it did when in the connected state. The pooled lubricant in the lubricant feed passage may still trickle through the flow restrictor and exit the outlet.

In another implementation, an automotive driveline unit housing may include a wall. The wall may partly or more define an interior of the automotive driveline unit housing. A lubricant bath may be held in the interior. The wall may have a lubricant feed passage with a first section and a second section. The first section may include an inlet and a single passage for lubricant flow spanning from the inlet. The second section may include a first passage and a second passage. The first and second passages may reside downstream the single passage and may fluidly communicate with the single passage. The first passage may have a first outlet, and the second passage may have a second outlet. During use, when the automotive driveline unit is in a connected state, lubricant from the lubricant bath may be received through the inlet and into the single passage by way of a spinning component of the automotive driveline unit. The received lubricant may flow from the single passage, into the first passage, and into the second passage. The received lubricant may exit the first outlet and may exit the second outlet. A first volumetric flow rate of lubricant exiting the first outlet may be less than a second volumetric flow rate of lubricant exiting the second outlet. The received lubricant in the first passage may pool upstream of the first outlet. During use, when the automotive driveline unit is in a disconnected state, the pooled lubricant in the first passage may continue to exit the first outlet after substantially all of the received lubricant in the second passage exits the second outlet.

In yet another implementation, an automotive driveline unit housing may include a wall. The wall may partly or more define an interior of the automotive driveline unit housing. A lubricant bath may be held in the interior. The wall may have a lubricant feed passage with a first section and a second section. The first section may include an inlet and a single passage for lubricant flow. The single passage may span from the inlet. The inlet may be open to the interior in order to receive lubricant from the lubricant bath. The second section may include a first passage and a second passage. The first and second passages may reside downstream the single passage and may fluidly communicate with the single passage. The first passage may have a first outlet, and the second passage may have a second outlet. The first outlet may be situated near a seal of the automotive driveline unit. The second outlet may be situated near a bearing of the automotive driveline unit. The first passage may have a flow restrictor. The flow restrictor may be located in the first passage and near the first outlet. The flow restrictor may inhibit the flow of lubricant that exits the first outlet. The second passage may lack a flow restrictor. During use, when the automotive driveline unit is in a connected state, lubricant from the lubricant bath may be received through the inlet and into the single passage by way of a spinning gear of the automotive driveline unit. The received lubricant may flow from the single passage, into the first passage, and into the second passage. The received lubricant may exit the first outlet and may exit the second outlet. The received lubricant in the first passage may pool upstream of the flow restrictor. The pooled lubricant may overflow from the first passage and into the second passage. During use, when the automotive driveline unit is in a disconnected state, the gear of the automotive driveline unit may cease spinning, and the pooled lubricant in the first passage may continue to exit the first outlet after substantially all of the received lubricant in the second passage exits the second outlet.

BRIEF DESCRIPTION OF THE DRAWINGS

The following detailed description of preferred embodiments and best mode will be set forth with reference to the accompanying drawings, in which.

DETAILED DESCRIPTION

Referring in more detail to the drawings, an automotive driveline unit housing 10 includes a lubricant feed passage 12 with a flow restrictor 14. Lubricant is more steadily fed out of the lubricant feed passage 12 via the flow restrictor 14, both when the accompanying automotive driveline unit is in a connected state of operation and when it is in a disconnected state of operation. Lubrication can hence more readily be maintained at components of the automotive driveline unit, even when lubricant is no longer sloshed and splashed about in the disconnected state. The automotive driveline unit housing 10 can be a housing of a power transfer unit (PTU), a final drive unit (FDU) or, as presented in the embodiment of FIG. 2, a rear drive unit (RDU). In this regard, the phrase "automotive driveline unit" is used in a broad sense to embrace PTUs, FDUs, and RDUs. Furthermore, as an aside, the terms "downstream" and "upstream" are used with respect to the direction of lubricant flow, such that downstream refers to a direction that follows the flow of lubricant, and upstream refers to a direction that goes against the flow of lubricant.

Figure 1:
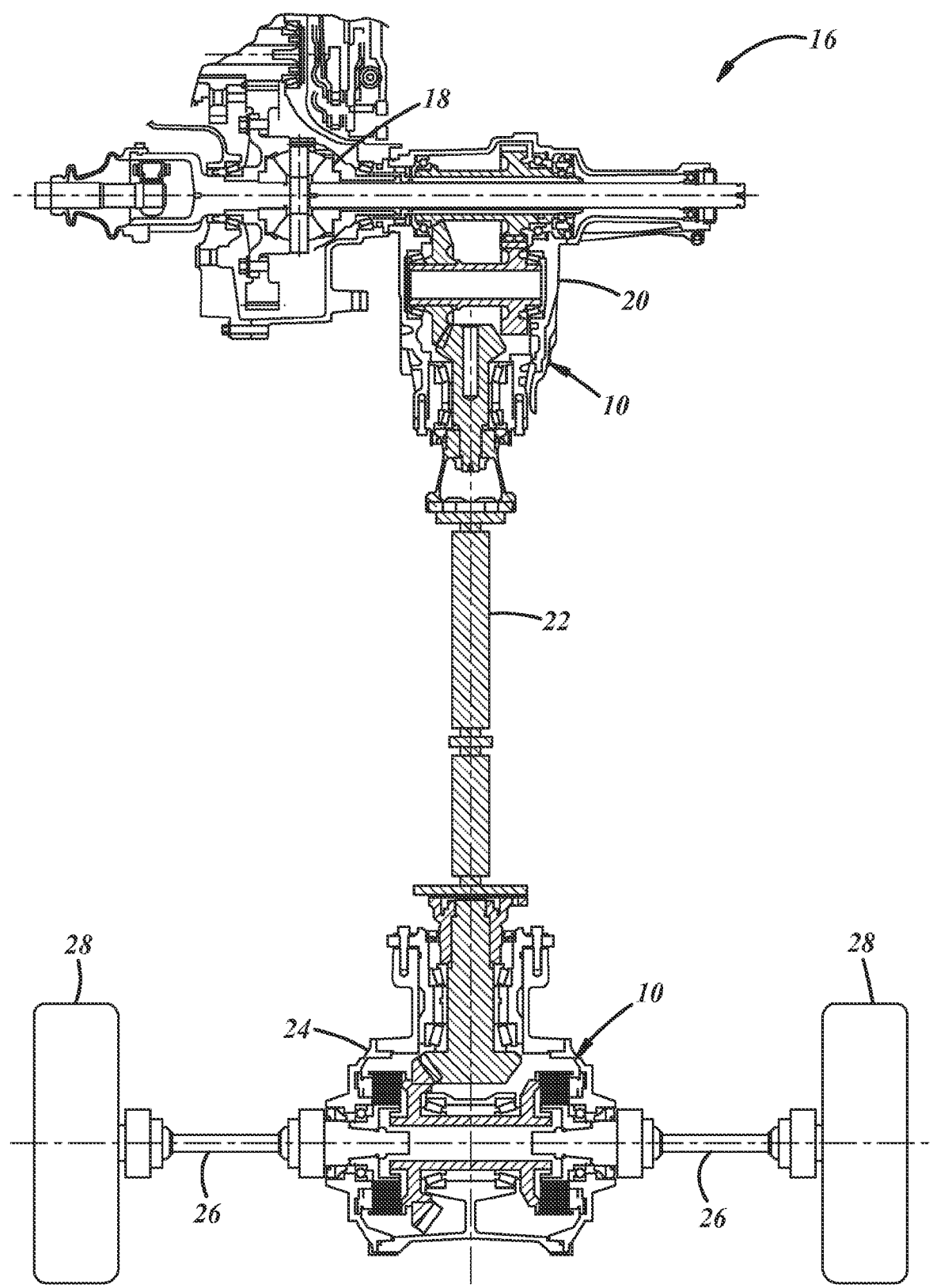
FIG. 1 is a schematic view of an example all-wheel drive (AWD) automotive driveline.

Some components of an example all-wheel drive (AWD) driveline 16 for an automobile are depicted in FIG. 1. Other example AWD drivelines could have different architectures and components than those illustrated in the figure depending upon, among other possible factors, the location of an accompanying engine and transmission, and disconnect and re-connect capabilities sought in the driveline. The AWD driveline 16 of FIG. 1 has an architecture suited for a front-mounted engine and transmission. In general, the AWD driveline 16 includes a front differential 18, a power transfer unit (PTU) 20, a propeller shaft 22, a rear drive unit (RDU) 24, sideshafts 26, and wheels 28 (wheels and sideshafts are also equipped at the front region of the AWD driveline, despite not being illustrated in FIG. 1). The general workings of these items will be appreciated by skilled artisans.

Figure 2:
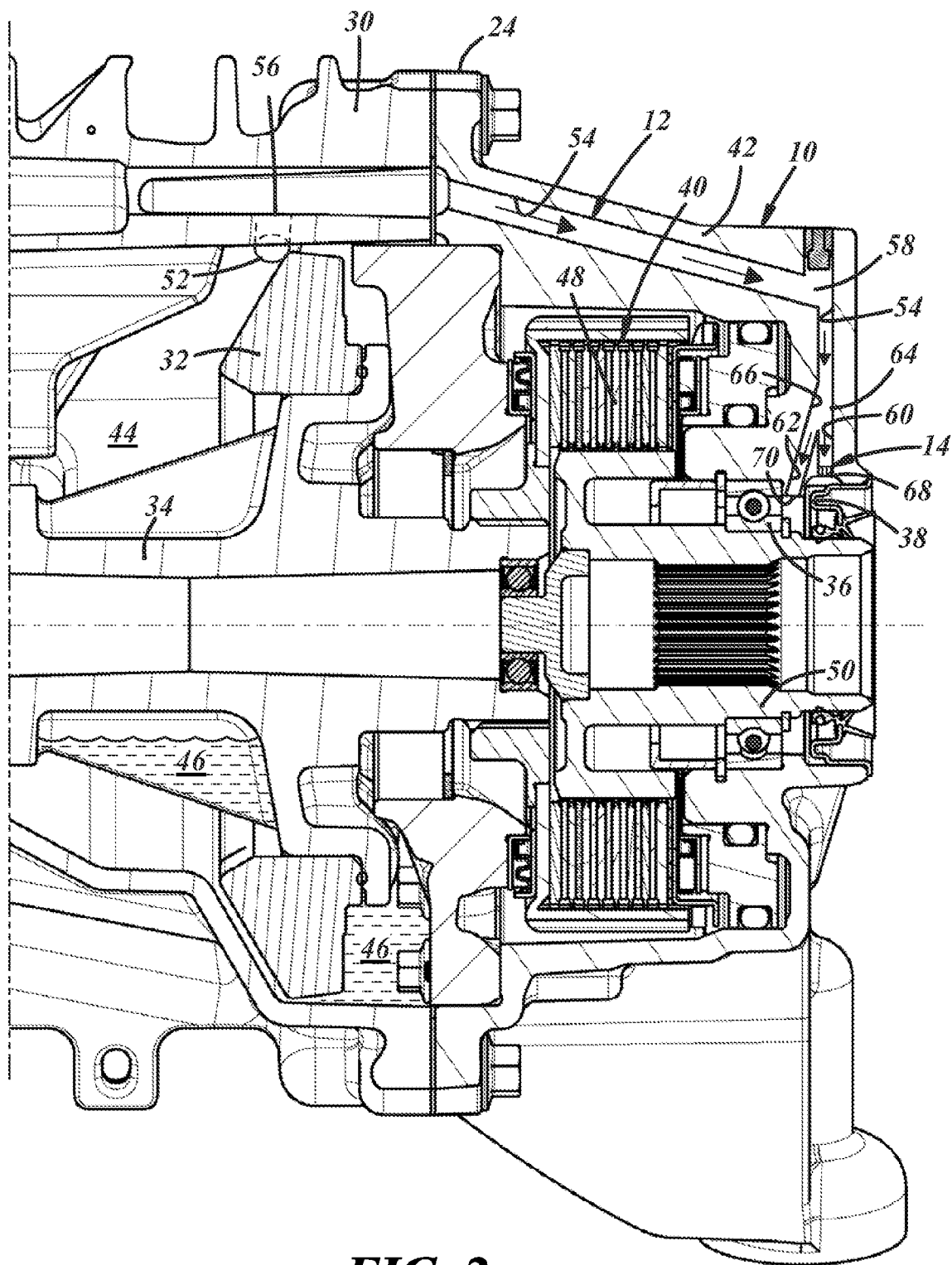
FIG. 2 is a segmented and sectional view of an example rear drive unit (RDU) having an embodiment of a lubricant feed passage.

Referring now to the example of FIG. 2, the RDU 24 has a housing 30, a gear 32, a shaft 34, a bearing 36, a seal 38, a clutch mechanism 40, as well as many other components. The housing 30 has one or more walls 42 that together at least partly define an interior 44. The wall(s) 42 can include discrete components, such as covers, that are connected together to make-up the construction of the housing 30. A lubricant bath 46 is held in the interior 44 and may only partially fill the interior 44 when the RDU 24 is in a state of rest as depicted in FIG. 2. The lubricant of the lubricant bath 46 is sloshed and splashed about in the interior 44 and can make its way to components of the RDU 24 in order to lubricate and cool the components. The gear 32 is partially submerged in the lubricant bath 46 and, when spun, causes the lubricant to slosh and splash about; in other examples, other components of the RDU 24 could cause lubricant to slosh and splash about, such as an outer disc carrier of the RDU 24. The gear 32 can be a hypoid ring gear as depicted, or can be another type of gear. The gear 32 can mesh with an input gear that is connected to the propeller shaft 22. The shaft 34 carries the gear 32. In this example, the clutch mechanism 40 provides disconnect and re-connect capabilities in the RDU 24; in other examples, the disconnect and re-connect capabilities could be provided in other ways such as by a dog clutch. Here, the clutch mechanism 40 has a clutch pack 48 with multiple plates that are pressed together in a connected state to transmit torque and rotation between the shaft 34 and a sleeve 50. The sleeve 50 can be coupled to one of the sideshafts 26 at the rear region of the AWD driveline 16. When in a disconnected state, the plates of the clutch pack 48 are separated and torque and rotation are not transmitted between the shaft 34 and sleeve 50.

Furnishing effective lubrication to components of the RDU 24 when the RDU 24 is in the disconnected state has presented challenges. In some instances the gear 32 does not spin sufficiently in the disconnected state in order to cause lubricant to slosh and splash about; in other instances the gear 32 does not spin at all. Consequently, it has been found that lubricant might not always be delivered to certain components of the RDU 24 when the RDU 24 is in the disconnected state. Keeping components lubricated even when disconnected and dormant may be useful—the components are readied for subsequent re-connection, the components more readily evade damage associated with the absence of lubrication, and the components maintain proper lubrication when they are put in action during an unwanted event known as back-driving in which spinning wheels and spinning sideshafts cause rotation of the disconnected components.

In the past, in order to satisfy lubrication demands, the RDU 24 would be brought to the connected state periodically amid operation of the AWD driveline 16 for the sole purpose of sloshing and splashing lubricant about in the RDU 24 to deliver lubricant to the RDU's components. The RDU 24 would otherwise be in the disconnected state and would be switched to the connected state, not because the AWD driveline 16 commanded the functionality due to road or driving conditions, but rather solely for lubricating components in the RDU 24. While the periodic connected state might be acceptable and suitable in some units and drivelines, it might introduce inefficiencies in others. For instance, switching from the disconnected state to the connected state may consume power, may escalate component wear and tear, may run the chance of vibrations and other unwanted noise among the component, and may reduce the overall operating efficiencies of the accompanying vehicle.

The lubricant feed passage 12 and the flow restrictor 14 can satisfy the lubrication demands of the RDU 24 and its components, both when the RDU 24 is in the connected state and when the RDU 24 is in the disconnected state. Lubrication is more readily maintained at the RDU's components, compared to previous lubrication attempts, even when lubricant is no longer being sloshed and splashed about in the disconnected state. The periodic connected state need not be carried out as it was in the past or as frequently as it was in the past, and the attendant inefficiencies can be minimized or altogether avoided. The lubricant feed passage 12 delivers lubricant to areas and to components of the RDU 24 that might otherwise be unavailable and inaccessible to lubricant flow due to their location in the RDU 24—for instance, structures and other components might block lubricant from making its way to certain areas and components. The lubricant feed passage 12 can have different designs and routes in different examples, depending in some cases on the design, construction, and components of the RDU 24. Still referring to FIG. 2, in this example the lubricant feed passage 12 is defined in the wall 42 of the housing 30, and begins its extent through the wall 42 at an inlet 52. The inlet 52 is depicted as a single hole in FIG. 2 for demonstrative purposes, and, in practice, could have a trough-like structure, gutter-like structure, or some other structure meant to receive and capture lubricant thrown about. The inlet 52 is open to the interior 44 and fluidly communicates with the interior 44 so that lubricant from the lubricant bath 46 can be accepted and received through the inlet 52 and into the lubricant feed passage 12. The inlet 52 could have other locations and orientations than those illustrated in FIG. 2, just as the lubricant feed passage 12 could have other routes through the wall 42 than that illustrated.

The lubricant feed passage 12 in the example of FIG. 2 has a first section and a second section. The first section is established by a single passage 54 that spans from the inlet 52 and that makes its way through the wall 42 toward the second section and toward one or more outlets of the lubricant feed passage 12. Along its extent, the single passage 54 takes a first turn 56 and a second turn 58, but could have other extents with or without turns in other examples.

The second section resides downstream the first section and is established by a first passage 60 and a second passage 62. The first and second passages 60, 62 span from the single passage 54. Indeed, the single passage 54 bifurcates into the first and second passages 60, 62, and the passages 60, 62 hence fluidly communicate with the single passage 54. As depicted in FIG. 2, the bifurcation occurs much closer to the outlet of the lubricant feed passage 12 than the inlet 52, and the first and second passages 60, 62 are thereby situated at a terminal extent of the lubricant feed passage 12. The bifurcation produces a somewhat Y-shaped set of passages at the terminal extent. The second passage 62 diverges from the immediately upstream single passage 54 at an acute angle relative to the first passage 60, and the first passage 60 remains in-line with the immediately upstream single passage 54. At their entrances, the first passage 60 has a first inlet 64 and the second passage 62 has a second inlet 66. And at their exits, the first passage 60 has a first outlet 68 and the second passage 62 has a second outlet 70. In this example the first outlet 68 is situated near the seal 38 so that lubricant exiting the first outlet 68 can be supplied directly to the seal 38 and then could make its way to the bearing 36, and the second outlet 70 is situated near the bearing 36 so that lubricant exiting the second outlet 70 can be supplied to the bearing 36. But for the first and second passages 60, 62, lubricant might not otherwise be supplied to the seal 38 and bearing 36. Still, in other examples, the first and second outlets 68, 70 could be situated near other components of the RDU 24 that require lubrication such as near a rotating journal.

In the example of FIG. 2, the flow restrictor 14 is located in the first passage 60 and at the first outlet 68; in other examples, the flow restrictor 14 could be located upstream the first outlet 68 and need not be located directly at the first outlet 68 as shown. The second passage 62 remains free of flow restriction in this example. The flow restrictor 14 inhibits the flow of lubricant exiting the first outlet 68. The amount of lubricant let through the flow restrictor 14 is less than the amount of lubricant that would exit the first outlet 68 if the first outlet 68 lacked the flow restrictor 14. The flow restrictor 14 can have various designs, constructions, and/or components in different embodiments to effect an inhibited lubricant flow. The flow restrictor 14 of the embodiment of FIG. 2 is similar to the flow restrictor 14 presented in FIG. 3A, and therefore reference is made to FIG. 3A since FIG. 2 shows the flow restrictor 14 in limited size. In this embodiment, the flow restrictor 14 has a plate 72 with a port 74. The plate 72 is set in the first passage 60 at the first outlet 68. The port 74 spans completely through the plate 72 and provides a passage for lubricant flow through the plate 72. The port 74 has an exit opening dimension at its outlet 76 that is lesser in value than an exit opening dimension at the first outlet 68, and is lesser in value than an exit opening dimension at the second outlet 70. The exit opening dimensions in this embodiment are diameters since the passages 60, 62 and port 74 are cylindrical. Still, in other embodiments the flow restrictor 14 could be a valve, could be another structure with a narrowed port, or could be something else that inhibits the flow of lubricant exiting the first outlet 68. Indeed, the flow restrictor 14 in other embodiments need not necessarily be a separate and discrete component from the housing 30, and instead could be a reduced-size exit opening in the wall 42 that communicates with the larger-sized first passage 60; the reduced-size exit opening could be drilled into the wall 42.

Referring again to FIG. 2, when put in use and the RDU 24 is in the connected state, the gear 32 and other RDU components spin and lubricant of the lubricant bath 46 is sloshed and splashed around in the interior 44. Some of the lubricant enters the single passage 54 via the inlet 52. The lubricant then travels downstream the inlet 52 and through the single passage 54 toward the first and second passages 60, 62. The movement of lubricant is represented in FIG. 2 by the arrowed lines placed in the lubricant feed passage 12 in the figure. At the second section, the lubricant travels into both the first and second passages 60, 62, or may travel initially into the first passage 60 with overflow then entering the second passage 62. The lubricant at the first passage 60 exits the port 74 at a first volumetric flow rate, while the lubricant at the second passage 62 exits the second outlet 70 at a second volumetric flow rate. In this embodiment, the first volumetric flow rate has a value that is less than the second volumetric flow rate. In this way, lubricant trickles out of the first passage 60 relative to its flow out of the second passage 62, and lubricant delivery out of the first passage 60 is checked relative to lubricant delivery out of the second passage 62. The first volumetric flow rate can also be less than a volumetric flow rate of the first outlet 68 when the first passage 60 lacks the flow restrictor 14.

Figure 3A:
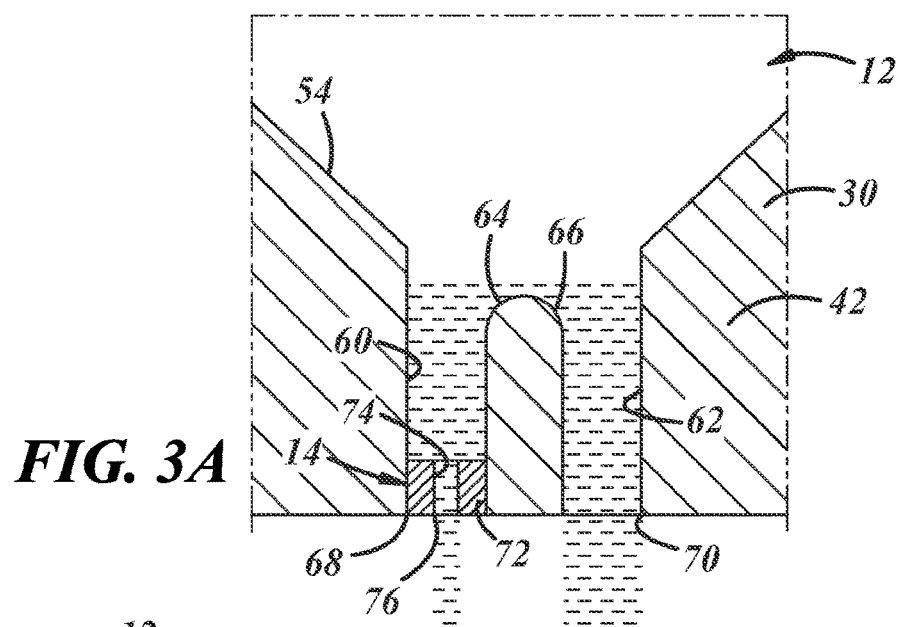
FIG. 3A is a segmented and enlarged view of another embodiment of a lubricant feed passage.

Referring to FIG. 3A for demonstrative purposes, because the lubricant flows into the first passage 60 at a greater rate than the lubricant exits the port 74, lubricant pools up and accumulates in the first passage 60. In this sense, the space defined in the first passage 60 immediately upstream the flow restrictor 14 serves as a reservoir for pooled lubricant. When the pooled lubricant gathers upstream the flow restrictor 14 and raises to the first inlet 64, excess lubricant can overflow into the second passage 62 and ultimately out the second outlet 70. In the connected state, lubricant can exit the second outlet 70 and port 74 at a somewhat steady outflow.

When the RDU 24 is in the disconnected state, the gear 32 and other RDU components typically do not spin. Lubricant, consequently, may not enter the lubricant feed passage 12, and the first and second passages 60, 62 may no longer be replenished with lubricant from the lubricant bath 46 as they were in the connected state. The lubricant at the second passage 62 substantially empties out of the second passage 62 via the second outlet 70 (a relatively small amount of lubricant may remain coated on the walls of the second passage 62; the term "substantially" is used herein to account for this occurrence). But the previously pooled lubricant can remain in the first passage 60 after lubricant has left the second passage 62. The pooled lubricant continues to trickle out of the port 74 even while the RDU 24 is in the disconnected state. In this example, this means that the seal 38 is still supplied with a somewhat steady outflow of lubricant in the disconnected state. The periodic connected state, as described earlier, need not be carried out as it was in the past, or at least need not be carried out as frequently as it was in the past; in some embodiments the RDU 24 can be switched to the connected state for the purpose of replenishing the pooled lubricant in the first passage 60.

As described, the lubricant feed passage 12 and flow restrictor 14 present a passive approach for furnishing lubrication to components of the RDU 24. In some cases, this approach may be preferred over a more active approach which could involve employing a pump mechanism to pump lubricant through a passage. The more active approach might involve added components and complexities, and might consume extra power, and therefore may be less desired.

Figure 3B:
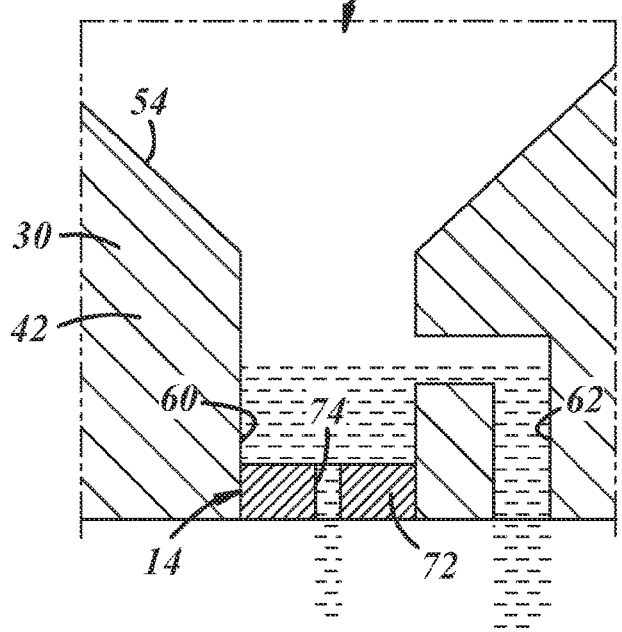
FIG. 3B is a segmented and enlarged view of yet another embodiment of a lubricant feed passage.
Figure 3C:
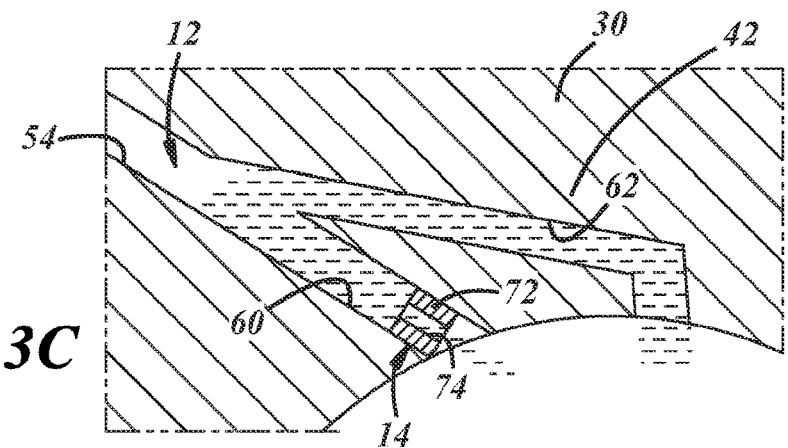
FIG. 3C is a segmented and enlarged view of still another embodiment of a lubricant feed passage.

FIGS. 3A-3C present different embodiments of the first and second passages 60, 62. In FIG. 3A, the first and second passages 60, 62 are arranged parallel to each other and are both generally in-line with the immediately upstream single passage 54. Overflow at the first passage 60 can enter the second passage 62. In FIG. 3B, the first passage 60 is generally in-line with the immediately upstream single passage 54. The second passage 62, in contrast, initially communicates with the first passage 60 at an orthogonal angle with respect to the general direction of lubricant flow through the first passage 60. The second passage 62 then turns at another orthogonal angle toward its outlet. In this embodiment, lubricant from the single passage 54 is first received in the first passage 60, and then overflow from the first passage 60 enters the second passage 62. Lastly, in FIG. 3C, the first passage 60 is generally in-line with the immediately upstream single passage 54, but its outlet is at an angle relative to its outlet in FIGS. 3A and 3B. The second passage 62 is arranged at an acute angle with respect to the general direction of lubricant flow through the first passage 60. Lubricant from the single passage 54 may first be received in the first passage 60, with overflow from the first passage 60 entering the second passage 62.

Still, the lubricant feed passage 12 and flow restrictor 14 could have other designs, constructions, and components in other embodiments that are not presented by the figures. For instance, the lubricant feed passage need not be bifurcated into the first and second passages and instead could remain a single passage throughout its full extent from inlet to outlet. Also, the RDU 24 of FIG. 2 could have a second lubricant feed passage and a second flow restrictor on the other side of the RDU 24 (left side in the orientation of FIG. 2) in order to furnish lubrication to components on that side.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. An automotive driveline unit, comprising:
a housing with a wall at least partly defining an interior of the automotive driveline unit, a lubricant bath held in said interior, said wall having a lubricant feed passage spanning therethrough from an inlet to an outlet, said inlet open to said interior to receive lubricant from said lubricant bath, said lubricant feed passage having a flow restrictor located therein adjacent said outlet in order to inhibit the flow of lubricant exiting said outlet;
wherein, when the automotive driveline unit is in a connected state, lubricant from said lubricant bath is received through said inlet and into said lubricant feed passage via a spinning component of the automotive driveline unit, the received lubricant trickles through said flow restrictor and exits said outlet, the received lubricant pools upstream of said flow restrictor in said lubricant feed passage; and
wherein, when the automotive driveline unit is in a disconnected state, the component of the automotive driveline unit ceases spinning and the pooled lubricant in said lubricant feed passage trickles through said flow restrictor and exits said outlet.

2. The automotive driveline unit as set forth in claim 1, wherein said lubricant feed passage includes a first passage and a second passage, both said first and second passages reside downstream said inlet, said outlet of said lubricant feed passage includes a first outlet at said first passage and a second outlet at said second passage, said flow restrictor is located in said first passage adjacent said first outlet in order to inhibit the flow of lubricant exiting said first outlet.

3. The automotive driveline unit as set forth in claim 2, wherein said first outlet is situated adjacent a seal of the automotive driveline unit, and said second outlet is situated adjacent a bearing of the automotive driveline unit.

4. The automotive driveline unit as set forth in claim 2, wherein said second outlet lacks a flow restrictor, and a first volumetric flow rate of lubricant exiting said first outlet is less than a second volumetric flow rate of lubricant exiting said second outlet.

5. The automotive driveline unit as set forth in claim 2, wherein said lubricant feed passage has a first section and a second section, said first section includes said inlet and a single passage for lubricant flow spanning from said inlet, said second section includes said first and second passages and said first and second outlets, said single passage bifurcating into said first and second passages and fluidly communicating with said first and second passages.

6. The automotive driveline unit as set forth in claim 2, wherein said first passage has a first inlet and said second passage has a second inlet, lubricant received through said first inlet and into said first passage pools upstream of said flow restrictor in said first passage and at least some of the overflowing lubricant at said first passage is received through said second inlet and into said second passage.

7. The automotive driveline unit as set forth in claim 2, wherein, when the automotive driveline unit is in the connected state, lubricant from said lubricant bath is received through a first inlet of said first passage and into said first passage, and lubricant from said lubricant bath is received through a second inlet of said second passage and into said second passage, the received lubricant pools upstream of said flow restrictor in said first passage, wherein, when the automotive driveline unit is in the disconnected state, the pooled lubricant in said first passage continues to trickle through said flow restrictor and exits said first outlet after lubricant substantially empties out of said second passage.

8. The automotive driveline unit as set forth in claim 2, wherein said flow restrictor comprises a plate with a port therethrough, said port has an exit opening dimension that is less than an exit opening dimension of said second outlet of said second passage.

9. The automotive driveline unit as set forth in claim 1, wherein said flow restrictor comprises a valve located in said lubricant feed passage.

10. The automotive driveline unit as set forth in claim 1, wherein the automotive driveline unit is a rear drive unit.

11. The automotive driveline unit as set forth in claim 1, wherein said outlet is situated adjacent a seal of the automotive driveline unit, adjacent a bearing of the automotive driveline unit, adjacent both the seal and the bearing, or adjacent a rotating journal of the automotive driveline unit.

12. An automotive driveline unit housing, comprising:
a wall at least partly defining an interior of the automotive driveline unit housing, a lubricant bath held in said interior, said wall having a lubricant feed passage with a first section and a second section, said first section including an inlet and a single passage for lubricant flow spanning from said inlet, said second section including a first passage and a second passage, said first and second passages residing downstream said single passage and fluidly communicating with said single passage, said first passage having a first outlet and said second passage having a second outlet wherein a restrictor is provided in said first passage and the restrictor has a port with a flow area that is less than a flow area of said second outlet of said second passage;
wherein, when the automotive driveline unit is in a connected state, lubricant from said lubricant bath is received through said inlet and into said single passage via a spinning component of the automotive driveline unit, the received lubricant flows from said single passage and into said first passage and into said second passage, the received lubricant exits said first outlet and exits said second outlet, a first volumetric flow rate of lubricant exiting said first outlet is less than a second volumetric flow rate of lubricant exiting said second outlet, the received lubricant in said first passage pools upstream of said first outlet; and
wherein, when the automotive driveline unit is in a disconnected state, the pooled lubricant in said first passage continues to exit said first outlet after substantially all of the received lubricant in said second passage exits said second outlet.

13. The automotive driveline unit housing as set forth in claim 12, wherein said first outlet is situated adjacent a seal of the automotive driveline unit and said second outlet is situated adjacent a bearing of the automotive driveline unit, or at least one of said first outlet or said second outlet is situated adjacent a rotating journal of the automotive driveline unit.

14. The automotive driveline unit housing as set forth in claim 12, wherein the pooled lubricant overflows from said first passage and into said second passage when the automotive driveline unit is in the connected state.

15. The automotive driveline unit housing as set forth in claim 12, wherein said first passage has a flow restrictor located therein adjacent said first outlet, said flow restrictor facilitating the first volumetric flow rate of lubricant exiting said first outlet being less than the second volumetric flow rate of lubricant exiting said second outlet.

16. The automotive driveline unit housing as set forth in claim 15, wherein said flow restrictor comprises a valve located in said first passage.

17. The automotive driveline unit housing as set forth in claim 12, wherein said first outlet of said first passage has an exit opening dimension that is less than an exit opening dimension of said second outlet of said second passage.

18. An automotive driveline unit housing, comprising:
a housing having a wall at least partly defining an interior of the automotive driveline unit housing, a lubricant bath held in said interior, said wall having a lubricant feed passage with a first section and a second section, said first section including an inlet and a single passage for lubricant flow spanning from said inlet, said inlet open to said interior to receive lubricant from said lubricant bath, said second section including a first passage and a second passage, said first and second passages residing downstream said single passage and fluidly communicating with said single passage, said first passage having a first outlet and said second passage having a second outlet, said first outlet is situated adjacent a seal of the automotive driveline unit, said second outlet is situated adjacent a bearing of the automotive driveline unit, said first passage having a flow restrictor located therein adjacent said first outlet in order to inhibit the flow of lubricant exiting said first outlet, said second passage lacking a flow restrictor;
a gear received within the housing and which rotates when torque is transmitted through the gear; and
a mechanism having disconnect and re-connect capabilities to define a connected state of the driveline unit in which the gear rotates, and a disconnected state of the driveline unit in which the gear does not rotate, and wherein, when the automotive driveline unit is in the connected state, lubricant from said lubricant bath is received through said inlet and into said single passage via the gear of the automotive driveline unit as the gear rotates, the received lubricant flows from said single passage and into said first passage and into said second passage, the received lubricant exits said first outlet and exits said second outlet, the received lubricant in said first passage pools upstream of said flow restrictor, the pooled lubricant overflows from said first passage and into said second passage; and
wherein, when the automotive driveline unit is in the disconnected state, the gear of the automotive driveline unit ceases rotating and the pooled lubricant in said first passage continues to exit said first outlet after substantially all of the received lubricant in said second passage exits said second outlet.

19. The automotive driveline unit as set forth in claim 18, wherein said flow restrictor comprises a plate with a port therethrough, said port has an exit opening dimension that is less than an exit opening dimension of said second outlet of said second passage.

20. The automotive driveline unit as set forth in claim 18, wherein said flow restrictor comprises a valve located in said first passage and adjacent said first outlet.

* * * * *